Aug. 3, 1948.  R. D. NELSON ET AL  2,446,300
COUPLING MEANS FOR GROUND RODS
Filed Aug. 10, 1946

INVENTOR.
ROLLAND D. NELSON
BY HENRY B. BEHLMER

ATTORNEY

Patented Aug. 3, 1948

2,446,300

UNITED STATES PATENT OFFICE 2,446,300

COUPLING MEANS FOR GROUND RODS

Rolland D. Nelson, Hales Corners, and Henry B. Behlmer, South Milwaukee, Wis., assignors to Line Material Company, Milwaukee, Wis., a corporation of Delaware Application August 10, 1946, Serial No. 689,702

4 Claims. (Cl. 174—6)

1

This inventon relates to ground rod constructions and is particularly directed to coupling means for ground rods.

In making electrical grounds it is frequently necessary to make deep grounds which necessitates the use of long ground rods. It is practically impossible to drive a single length of ground rod to a great depth because the rod has so much whip during the early stages of the pounding and also because the upper end of the rod is almost always inaccessible for the man in the driving position.

Heretofore, threaded couplings have been used, but the threading is an expensive process and it is difficult to keep the threaded portions in an undamaged state during the normal handling of the ground rods.

Objects of this invention are to provide a means of electrically and mechanically coupling sections of ground rods together in an automatic manner, so that after the first section has been driven into the ground the mere driving of the second section serves to automatically produce an excellent coupling between the first and second sections or, in fact, between any two adjacent sections if more than two are used.

Further objects are to provide a means of coupling sections of ground rods which requires no threading and in which there is practically no chance of damaging the ends of the ground rods during normal handling, in which the coupling unit is of very simple construction and does not require any special machining or processing of the adjacent ends of the sections, and which is so constructed that it may be quickly applied by an unskilled operator and will secure the desired good electrical and firm mechanical connection.

A specific object of certain forms of this invention is to provide a coupling device which will coact with the adjacent ends of copper sheathed ground rods to strip a small portion of the sheath from each of the adjacent ends and cause interlocking engagement between such stripped portions and the coupling device when a succeeding section of a ground rod is forced towards the preceding section during the downward pounding of the succeeding section.

Embodiments of the invention are shown in the accompanying drawings, in which.

2 on the adjacent ends of two sections of ground rods before the second section has been driven into place.

Figure 4:
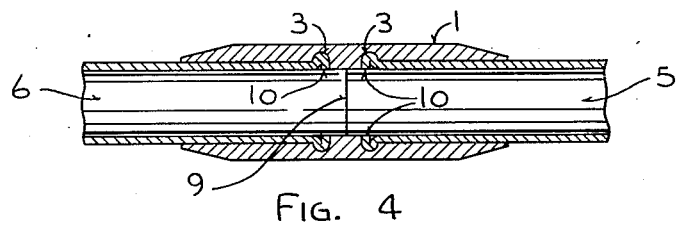

Figure 4 is a view showing the position of the parts after the second section has been driven into place.

Figure 5:
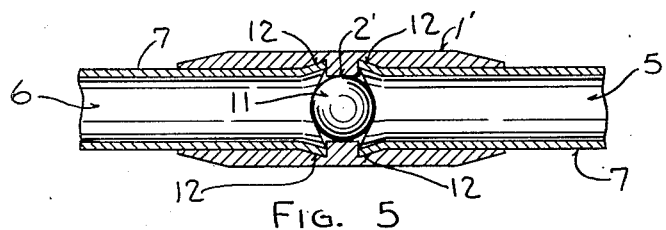
Figure 6:
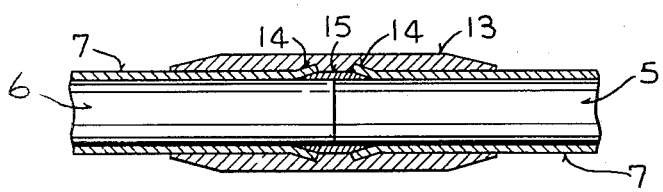
Figure 7:
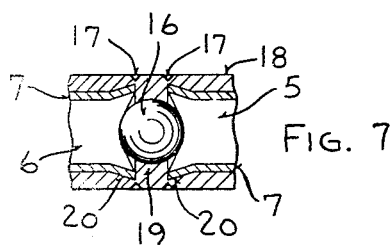

Figures 5, 6, and 7 are views corresponding to Figure 4 showing further forms of the invention.

Referring to the first form of the invention shown in Figures 1 through 4, it will be seen that the connector comprises a sleeve 1 of brass or other suitable metal having high electrical conductivity and sufficient mechanical strength. This sleeve has an internal, centrally located barrier 2 which is itself apertured. The diameter of the aperture through the barrier 2 is less than the internal diameter for the major portion of the sleeve 1. A pair of spaced grooves 3 are located internally of the sleeve and are arranged on opposite sides of the barrier 2.

This connector is adapted to receive adjacent ends of the multiple section ground rods. For example, the ground rods are usually formed of steel and are indicated by the reference characters 5 and 6. These steel rods are provided with a copper sheath 7 and are preferably notched as indicated at 8 for a portion of Figure 3. The copper sleeves are drawn over the steel rods and embed themselves in the notches 8.

In practicing this invention, the first ground rod, for instance the pointed ground rod 5, is driven down into the ground until the top of the rod is very nearly at ground level. Thereafter the connector 1 is slipped over the upper end of the first section of the ground rod, and the second section of the ground rod is positioned within the connector 1, so that the end faces 9 of the adjacent sections of the ground rods are approximately at the barrier 2. The aperture through the barrier is approximately the diameter of the steel cores 5 and 6 of the ground rods and it will be seen that the copper sheath 7 on each section of the ground rod is in contact with the barrier 2. Thereafter the upper section of the ground rod is driven down by pounding or in any other suitable manner, and when this is down it will be found that the copper sheath 7 is stripped back from the ends of the adjacent sections of the ground rods and is received within the grooves 3 and interlocks with the connector. The stripped portions of the sheaths 7 are indicated by the reference character 10 in Figure 4. It will be found that the faces 9 at the adjacent ends of the ground rods are in abutting contact with each other and that each ground rod is securely locked to the connector 1, and a very secure mechanical connection, as well as excellent electrical connection is obtained when this method is followed.

The invention may take other forms. For instance, as shown in Figure 5 a hardened steel ball 11 may be wedged in the aperture of the barrier 2' and annular recessed portions 12 may be formed on opposite sides of the barrier 2'. In this form of the invention, the copper sheath is not stripped off, but instead the ends of the adjacent sections of the ground rods are enlarged or swelled when the second section is driven downwardly and the enlarged or swelled ends are received within the annular recesses 12 in interlocking relation therewith. This also forms a good electrical connection as well as a strong mechanical connection. The connector is indicated by the reference character 1' in this form of the invention.

In the form of the invention shown in Figure 6 the connector is indicated at 13 and is provided with annular recesses 14. This connector is the main sleeve portion and carries an auxiliary or internal sleeve 15 which has tapered ends as indicated in Figure 6, arranged to strip the copper sheath from each of the adjacent ground rods and to force the stripped copper sheath outwardly into interlocking engagement with the annular recesses 14, to thereby form an excellent electrical and mechanical connection.

In the form of the invention shown in Figure 7, the hardened steel ball is indicated by the reference character 16 and it is locked in place by forming annular, externally located depressions 17 in the connector 18, so as to cause the barrier or central portion 19 of the connector to fit the contour of the ball and thus lock the ball in place. This connector is provided with the annular, internally located recesses 20 similarly to that shown in Figure 5 to receive the enlarged or swelled ends of the ground rods.

It is apparent that, if desired, other types of ground rods than the copper clad type can be used in the form of the invention shown in Figures 5 and 7. However, the copper clad rod is the preferred type of ground rod as it has minimum electrical resistance.

Figure 1:
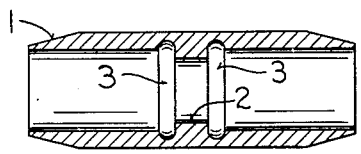
Figure 1 is a longitudinal sectional view through one form of coupling.
Figure 2:
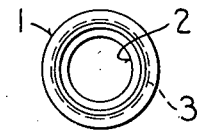
Figure 2 is an end view of the structure shown in Figure 1.
Figure 3:
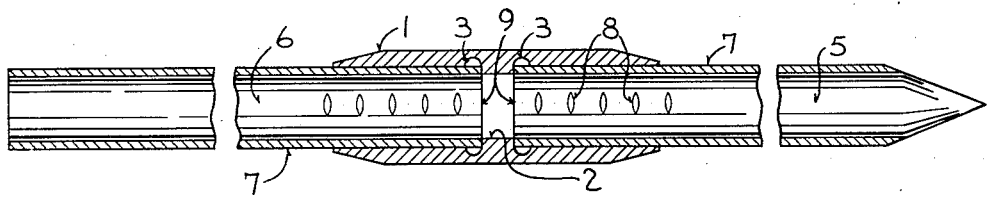
Figure 3 is a view showing the coupling in place

In all forms of the invention the steel cores of the ground rods or, in other words, the main central rod of the ground rod is provided with small notches 8 shown in Figure 3 throughout its length, so as to cause firm interlocking of the copper sheath which is drawn over the steel core or central rod.

It will be seen that a novel ground rod construction has been provided whereby it is a simple matter to drive a ground rod very deep into the ground without any damage to the rod and without any thought on the part of the operator.

Also it will be seen that no threading or other machining of the ends of the ground rods is necessary. They merely have to be cut across square as shown in the drawings. When the second section of a succeeding section, in the event there are more than two sections used, is driven into place the interlocking is automatically obtained without any thought on the part of the operator. This interlocking has been found to be extremely strong mechanically and to give an excellent electrical connection between the successive sections of the ground rods.

Although this invention has been described in considerable detail, it is to be understood that such description is intended as illustrative rather than limiting, as the invention may be variously embodied and is to be interpreted as claimed.

We claim:

1. In a ground rod construction, a pair of ground rods having adjacent ends and each having a metal central rod and a metal outer sheath, and a coupling electrically and mechanically joining said rods and comprising a sleeve extending over the adjacent ends of the ground rods and having a pair of spaced inner annular grooves, and means arranged to strip the metal sheaths from said central rods and wedge said sheaths within said grooves without distorting the ends of said central rods.

2. In a ground rod construction, a pair of ground rods having adjacent ends and each having a metal central rod and a metal outer sheath, and a coupling electrically and mechanically joining said ground rods and comprising a sleeve extending over the adjacent ends of the ground rods and having an internal annular barrier intermediate its ends engaging and arranged to strip the metal sheath from the adjacent ends of the central rods when one rod is forced towards the other rod, said sleeve having annular internal grooves on opposite sides of said barrier for receiving and interlocking with the stripped portion of the sheath of the respective ground rods.

3. In a ground rod construction, a pair of ground rods having adjacent ends and each comprising a central metal rod and an outer metal sheath, and a coupling mechanically and electrically connecting said ground rods and comprising a sleeve having portions extending over the outer sheath of the adjacent ends of said ground rods and having annular internally located grooves, and means arranged to force the metal sheaths of the ground rods into interlocking relation with said grooves when one ground rod is forced towards the other ground rod.

4. In a ground rod construction, a pair of ground rods having adjacent ends and each having a central metal rod and an outer metal sheath, a coupling assembly including a main sleeve arranged to receive the adjacent ends of said rods and an inner stripping sleeve having beveled ends arranged to strip the sheath from the adjacent ends of said rods when one rod is forced towards the other rod, said main sleeve having internal annular recesses on opposite sides of said inner stripping sleeve arranged to receive and interlock with the stripped portions of said sheaths.

ROLLAND D. NELSON.
HENRY B. BEHLMER.

REFERENCES CITED

The following references are of record in the file of this patent:

UNITED STATES PATENTS

| Number | Name | Date |
| --- | --- | --- |
| 791,330 | Dodge | May 30, 1905 |
| 1,661,712 | Van Wagner | Mar. 6, 1928 |
| 2,111,799 | Newpher | Mar. 22, 1938 |
| 2,186,482 | Frank | Jan. 9, 1940 |